United States Patent
Chiu et al.

(10) Patent No.: US 7,519,203 B2
(45) Date of Patent: *Apr. 14, 2009

(54) PORTABLE ENCRYPTED STORAGE DEVICE WITH BIOMETRIC IDENTIFICATION AND METHOD FOR PROTECTING THE DATA THEREIN

(75) Inventors: Li-Kuo Chiu, Taipei (TW); Bruce C. S. Chou, Hsin Chu (TW)

(73) Assignees: Egis Technology Inc., Taipei (TW); Aimgene Technology Co., Ltd., Taipei County (TW)

( * ) Notice: Subject to any disclaimer, the term of this patent is extended or adjusted under 35 U.S.C. 154(b) by 704 days.

This patent is subject to a terminal disclaimer.

(21) Appl. No.: 11/115,212

(22) Filed: Apr. 27, 2005

(65) Prior Publication Data

US 2005/0244037 A1 Nov. 3, 2005

(30) Foreign Application Priority Data

Apr. 30, 2004 (TW) .............................. 93112282 A

(51) Int. Cl.
*G06K 9/00* (2006.01)

(52) U.S. Cl. .................... 382/124; 235/382; 705/51; 713/185; 713/193

(58) Field of Classification Search ................ 382/124, 382/125, 115, 116; 713/178, 186, 202, 185, 713/193; 235/380, 382; 705/51

See application file for complete search history.

(56) References Cited

U.S. PATENT DOCUMENTS

| | | | |
|---|---|---|---|
| 4,582,985 A | | 4/1986 | Lofberg |
| 6,213,403 B1 | | 4/2001 | Bates, III |
| 6,219,439 B1 | * | 4/2001 | Burger .................... 382/115 |
| 6,910,132 B1 | * | 6/2005 | Bhattacharya .............. 713/186 |
| 7,284,266 B1 | * | 10/2007 | Morris et al. .................. 726/9 |
| 2001/0023375 A1 | | 9/2001 | Shen |
| 2002/0018585 A1 | * | 2/2002 | Kim .......................... 382/125 |
| 2003/0005336 A1 | * | 1/2003 | Poo et al. .................... 713/202 |
| 2003/0005337 A1 | | 1/2003 | Poo et al. |
| 2003/0014637 A1 | * | 1/2003 | Ellison et al. ............... 713/178 |
| 2003/0188201 A1 | * | 10/2003 | Venkataramappa ......... 713/202 |

(Continued)

FOREIGN PATENT DOCUMENTS

EP 0 124 079 A2 11/1984

(Continued)

*Primary Examiner*—Gregory M Desire
(74) *Attorney, Agent, or Firm*—Muncy, Geissler, Olds & Lowe, PLLC

(57) ABSTRACT

A portable encrypted storage device with biometric identification includes a host interface connected to a terminal host, a controller connected to the host interface, a memory module, a fingerprint sensor, an encryption/decryption chip and a portable large-capacity storage unit connected to the controller. The controller communicates with the host by handshakes and enables the host to automatically run a fingerprint identification driver and application program from the memory module to the host. The host receives an instruction from the user through the driver and program, and informs the controller to control the fingerprint sensor to read to-be-recognized fingerprint data of the user. The host judges whether or not the to-be-recognized fingerprint data substantially matches with a fingerprint template stored in the memory module. If a match occurs, the host can recognize and access the hidden portable large-capacity storage unit through the encryption/decryption chip.

12 Claims, 3 Drawing Sheets

U.S. PATENT DOCUMENTS

| | | |
|---|---|---|
| 2004/0117636 A1* | 6/2004 | Cheng .................. 713/185 |
| 2004/0123113 A1* | 6/2004 | Mathiassen et al. ......... 713/185 |
| 2005/0144464 A1* | 6/2005 | Chiu et al. .................. 713/186 |
| 2005/0210271 A1* | 9/2005 | Chou et al. ................. 713/186 |
| 2005/0289072 A1* | 12/2005 | Sabharwal .................. 705/59 |
| 2006/0069826 A1* | 3/2006 | Lei et al. ..................... 710/72 |
| 2006/0229988 A1* | 10/2006 | Oshima et al. ............... 705/50 |
| 2007/0150963 A1* | 6/2007 | Lee et al. ..................... 726/27 |
| 2008/0072073 A1* | 3/2008 | Yang .......................... 713/193 |

FOREIGN PATENT DOCUMENTS

| | | |
|---|---|---|
| GB | 2 387 933 A | 10/2003 |
| WO | WO-02/42887 A2 | 5/2002 |

* cited by examiner

PORTABLE ENCRYPTED STORAGE DEVICE WITH BIOMETRIC IDENTIFICATION AND METHOD FOR PROTECTING THE DATA THEREIN

BACKGROUND OF THE INVENTION

1. Field of the Invention

The invention relates to a portable encrypted storage device with biometric identification, and more particularly to a portable large-capacity storage device with a fingerprint sensor and a method for protecting data stored therein. The invention also correlates to the patent applications to some of the inventors: (a) U.S. patent application Ser. No. 10/998,722, filed on Nov. 30, 2004, and entitled "MEMORY STORAGE DEVICE WITH A FINGERPRINT SENSOR AND METHOD FOR PROTECTING THE DATA THEREIN"; (b) U.S. patent application Ser. No. 10/403,052, filed on Apr. 1, 2003, entitled "CAPACITIVE FINGERPRINT SENSOR," and published on Oct. 9, 2003 as US20030190061A1; (c) U.S. patent application Ser. No. 10/434,833, filed on May 13, 2003, entitled "PRESSURE TYPE FINGERPRINT SENSOR FABRICATION METHOD," and published on Nov. 20, 2003 as 20030215976A1; (d) U.S. patent application Ser. No. 10/414,214, filed on Apr. 16, 2003, and entitled "THERMO-ELECTRIC SENSOR FOR FINGERPRINT THERMAL IMAGING"; (e) U.S. patent application Ser. No. 10/638,371, filed on Aug. 12, 2003, and entitled "CAPACITIVE MICRO PRESSURE SENSING MEMBER AND FINGERPRINT SENSOR USING THE SAME"; and (f) Taiwan Patent Application No. 090112023, filed on May 17, 2001, and entitled "CAPACITIVE PRESSURE MICROSENSOR AND METHOD FOR MANUFACTURING THE SAME AND DETECTING SIGNALS OF THE SAME", now issued as Invention Patent Number 182652.

2. Description of the Related Art

The conventional method for protecting the personal data is often made by way of password protection. However, using the password to protect the personal data is troublesome because the user tends to forget the password and the password may also be dangerously cracked. Hence, the biometrics identification methods based on the biometrics data particular to the personal, such as the fingerprint, voice, signature, and iris, have been gradually developed in order to provide the more complete and effective data protection methods. The advantages are that the biometric feature is always kept on the user and the user does not need to memorize the feature, the biometric feature cannot be stolen, and the fingerprint biometrics feature protection method is strict and very convenient.

Recently, owing to the invention of the chip-type fingerprint sensor, the miniaturized electrical product incorporated with the fingerprint identification device becomes the technology that can be implemented. The associated technology can be found in the above-mentioned (b) to (f) patents. Thus, novel personal applications, such as the portable electrical products with the fingerprint identification function, have been developed.

More particularly, the aspect of the storage medium protection is an important development item incorporated with the biometrics identification method. For example, U.S. Pat. No. 4,582,985 issued on Apr. 15, 1986 has disclosed a method for protecting data in a memory by way of fingerprint identification, wherein the fingerprint is captured and identified in the same independent device. Although the application object thereof is to prevent the personal credit card from being counterfeited, this device has a high price because the image processing and identification module needs a high-level microprocessor, such as a 32-bit RISC (Reduced Instruction Set Computer, RISC) processor or DSP (Digital Signal Processor) chip, in addition to that the fingerprint sensor is needed, which causes the independent identification device not easy to be popularized.

U.S. Pat. No. 6,213,403; WO 02/42887 A2; U.S. Pat. No. 6,213,403; EP 124079A1; U.S. Pat. Publication No. 2003/005337; and GB 2387933 disclose devices for protecting data stored in the memory by way of fingerprint identification. Each of the devices is similar to the storage device having a fingerprint sensor, as disclosed in U.S. Pat. No. 4,582,985, and the disclosed fingerprint identification architecture is mainly the independent fingerprint identification device, in which the fingerprint is captured and identified in the same device.

Heretofore, the prior arts have a common feature of providing an independent fingerprint identification device including a fingerprint sensor, and a fingerprint image processing and identification IC. Such a design is intuitive and easily implemented and there is no need to install the fingerprint application program in the terminal system and the convenience of plug-and-play function may be provided. However, the prior art devices have an important problem of the high prices because a fingerprint image processing and identification IC and its associated memory components have to be utilized. Usually, the IC is the 32-bit RISC or DSP so as to perform the fingerprint identification effectively. Consequently, the conventional portable storage device with a fingerprint sensor has the drawback of high cost.

In order to solve the high cost problem, it is preferred to utilize the microprocessor of the terminal host to execute the fingerprint image processing and identification so as to effectively reduce the cost. For example, as disclosed in U.S. Patent Publication No. 2003/005337, the fingerprint processing and identification software can be installed in the terminal host in advance, and the microprocessor of the terminal host can execute the fingerprint image processing and identification processes. However, such a design has a greatest drawback that the user cannot conveniently use the device over various terminal hosts in a plug-and-play manner, or the user has to spend time to install the software laboriously.

Therefore, the above-mentioned (a) patent discloses a method for solving the above-mentioned problems, in which a fingerprint application program with the function of the fingerprint image processing and identification is automatically run in the terminal host without the fingerprint processing and identification software being installed in the terminal host in advance. In this patent, the microprocessor of the terminal host is used to execute the fingerprint image processing and identification process, and the device can be conveniently used and the cost thereof can be effectively reduced.

Heretofore, the prior arts protect the data in the memory, especially a non-volatile flash memory, according to human fingerprints. However, other types of portable large-capacity storage units, especially the magnetic hard disk and optical disk, have become another important development trend under the considerations of the cost and the high capacity.

U.S. Patent Publication No. 2001/0023375 discloses a fingerprint hard disk device, in which the authority for accessing the data in the magnetic hard disk is determined by way of fingerprint identification. The '375 patent mainly utilizes an independent fingerprint identification module for capturing, storing and comparing the fingerprints. After the identification of the user is determined, a control signal is provided to an electric controlled switch so as to disable or enable the hard disk. This design is advantageous because no fingerprint application program has to be installed in the terminal host and the plug-and-play function can be conveniently provided. However, this product has a high price. Furthermore, using the hardware switch to control the enabled/disabled state of the hard disk is not a safe design and tends to be easily cracked because a hacker can easily provide a fake signal to the hardware switch to replace the fingerprint authentication. Meanwhile, the method for protecting the data stored in the hard disk is not clearly described in this patent.

SUMMARY OF THE INVENTION

It is therefore an object of the invention to provide a portable encrypted storage device with biometric identification and a method for protecting the data therein, in which the encryption/decryption chip is enabled by way of fingerprint identification so as to protect the stored important data from being accessed by an unauthorized user.

Another object of the invention is to provide a portable encrypted storage device with biometric identification and a method for protecting the data therein, in which the fingerprint data is processed by a microprocessor of a terminal host such that the cost of the device may be reduced.

Still another object of the invention is to provide a portable encrypted storage device with biometric identification and a method for protecting the data therein, in which the fingerprint identification driver and application program may be automatically run in the terminal host, such that the device may be used in a plug-and-play manner in various terminal systems without the driver being installed in advance.

To achieve the above-mentioned objects, the invention provides a portable encrypted storage device with biometric identification. The device includes a host interface connected to a terminal host, a controller connected to the host interface, a memory module, a fingerprint sensor, an encryption/decryption chip and a portable large-capacity storage unit connected to the controller. The controller communicates with the host by handshakes and enables the host to automatically run a fingerprint identification driver and application program from the memory module to the host. The host receives an instruction from the user through the driver and program, and informs the controller to control the fingerprint sensor to read to-be-recognized fingerprint data of the user. The host judges whether or not the to-be-recognized fingerprint data substantially matches with a fingerprint template stored in the memory module. If a match occurs, the host can recognize and access the hidden portable large-capacity storage unit through the encryption/decryption chip.

Thus, the data of the portable. large-capacity storage unit can be encrypted so that the confidential data stored therein cannot be easily decrypted even if the storage unit is stolen.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The invention is characterized in solving a few problems in the above-mentioned prior arts.

First, the invention device utilizes the microprocessor of the terminal host to execute the fingerprint image processing and identification processes without the independent fingerprint identification microprocessor of the prior art. So, the cost of the device can be greatly reduced.

Second, although the invention device does not have the independent fingerprint identification microprocessor, the fingerprint identification driver and application program can be automatically run (auto-run) in the terminal host. So, it is unnecessary to manually install the driver and program in the terminal host before use, and the portable device of the invention can be conveniently used in various terminal hosts.

Third, the invention device provides an encryption/decryption chip for rapidly and safely encrypting the data to be written into the portable large-capacity storage unit, or decrypting the data read from the portable large-capacity storage unit. Thus, even if the portable large-capacity storage unit is removed from the device, the format and content of the data cannot be correctly acquired. In addition, the key for enabling the encryption/decryption chip is stored in a place other than the large-capacity storage unit, and cannot be obtained until the fingerprint identification passes. Thus, the safety of data access of this device can be further enhanced.

Figure 1:
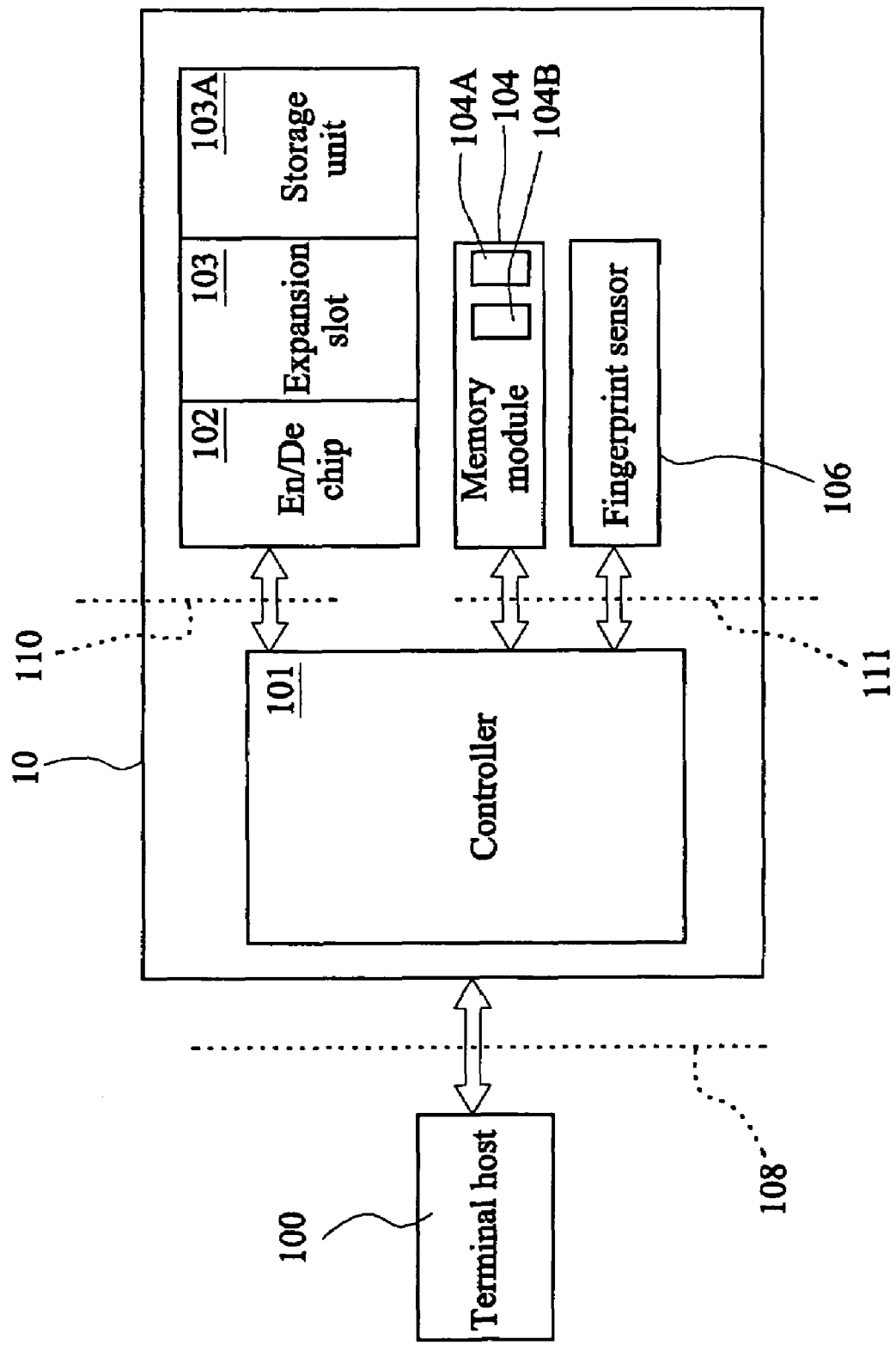
FIG. 1 is a block diagram showing a portable encrypted storage device 10 with biometric identification according to a first embodiment of the invention.

Referring to FIG. 1, a portable encrypted storage device 10 with biometric identification according to a first embodiment of the invention includes a controller 101, and the controller 101 provides a storage interface 110 to be connected to a storage interface expansion slot 103 through an encryption/decryption chip (En/De chip) 102. At least one large-capacity storage unit 103A may be inserted into an expansion slot 103. One embodiment of the large-capacity storage unit 103A is a magnetic hard disk drive, especially a 2.5" hard disk drive or a smaller or a larger hard disk drive. Another embodiment of the large-capacity storage unit 103A is an optical disk device with the specification of CD-R/RW, DVD-R/RW, or the like.

In addition, the controller 101 provides another memory interface 111 to be connected to a memory module 104 and a biometric feature sensor 106. In one embodiment of the invention, the biometric feature sensor 106 is a fingerprint sensor, especially an area-type or a sweep-type fingerprint sensor with the reduced size and cost. In addition, the biometric feature sensor 106 may be a sensor for detecting human faces, eyes or other biometric features. Meanwhile, the controller 101 provides a host interface 108 to be connected to an external terminal host 100. In this embodiment, the host interface 108 is a universal serial bus (USB) interface, a PCMCIA interface, a PCI express interface, an IEEE 1394 interface or other standard interfaces. The storage interface 110 in this embodiment is an IDE interface, a SCSI interface, a serial ATA interface, a compact flash (CF) interface, a PCMCIA interface, an IEEE 1284 interface or other standard interfaces.

The memory module 104 is a non-volatile memory. In this embodiment, the memory module 104 is a non-volatile flash memory, a NAND flash, a NOR flash, a programmable read only memory (PROM), a read only memory (ROM) or an electrically erasable programmable read only memory (EEPROM).

In one embodiment of the invention, the controller 101, the encryption/decryption chip, the memory module and the chip-type fingerprint sensor used in the above-mentioned device of the invention may be integrated into a single chip by way of the system-on-chip (SOC) design architecture so that the cost can be reduced.

The memory module 104 is divided into a public block 104A for storing at least one fingerprint identification driver and application program, and a hidden block 104B for storing at least one fingerprint template and a key for the encryption/decryption chip 102. The fingerprint template is the data encrypted according to the key.

The controller 101 can immediately acquire the fingerprint data and upload the acquired data to the terminal host 100 through the fingerprint sensor 106. The terminal host 100 compares the acquired fingerprint data with the previous fingerprint template. The fingerprint template is the fingerprint data, which is stored in the memory module 104 when a user firstly uses this device. The fingerprint data serves as a standard for the subsequent fingerprint data comparison. Thus, the fingerprint sensor 106 is connected to the controller 101, senses the fingerprint template of an authorized user, and also senses the to-be-recognized fingerprint data of a user to be compared with the fingerprint template.

In brief, the invention device utilizes a memory module 104 and its data dividing method to automatically run the fingerprint application program in the terminal host, which executes the program, through the controller 101, and it is unnecessary to use an independent fingerprint identification module. This method is disclosed in the above-mentioned '722 patent application, and detailed descriptions thereof will be omitted.

After the fingerprint data of the user is verified, the controller 101 transmits the key used in the encryption/decryption chip 102 to the encryption/decryption chip 102 so as to access this portable large-capacity storage unit using the real-time encrypting and decrypting engine. The encryption/decryption chip of the device operates according to a symmetrical algorithm with a data encryption standard (DES) or a triple DES or AES (Advanced Encryption Standard). The encryption/decryption chip can immediately process the data with 1.6 Gbits/sec, so no time delay occurs when the large-capacity storage unit data is being accessed. Compared to the encryption/decryption method using software, the encryption/decryption chip has a higher efficiency and is harder to be cracked.

In addition, the advantage of the encryption/decryption method of the invention is that the key for the encryption/decryption engine is not stored in the encryption/decryption chip. Instead, after the fingerprint identification passes, the key is outputted from the hidden block of the memory module, and the data in the hidden block is encrypted according to the personal fingerprint features. So, the key cannot be obtained by way of cracking. In order to increase the safety level, the key may be generated by software with varying time.

In addition, the invention device is for accessing the data of the large-capacity storage unit such as the hard disk drive and the optical disk drive through the hardware encryption/decryption engine chip in a more efficient way than the time-consuming software encryption/decryption process. In addition, it is safer because the encryption/decryption process is independently performed outside the terminal system.

Therefore, the portable encrypted storage device 10 with biometric identification according to this embodiment is to be connected to the terminal host 100. The device 10 includes a host interface 108 connected to the terminal host 100, a controller 101 connected to the host interface 108, a fingerprint sensor 106 connected to the controller 101 and sensing to-be-recognized fingerprint data of a user, a memory module 104 connected to the controller 101, an encryption/decryption chip 102 connected to the controller 101 and containing an encryption/decryption engine, a storage interface expansion slot 103 connected to the encryption/decryption chip 102, and a large-capacity storage unit 103A connected to the storage interface expansion slot 103. The memory module 104 is divided into a public block 104A for storing at least one fingerprint identification driver and application program, and a hidden block 104B for storing a fingerprint template and a key. The data stored in the hidden block 104B has been encrypted.

After the portable encrypted storage device 10 is connected to the terminal host 100, the controller 101 communicates with the terminal host 100 by handshakes through the host interface 108, and enables the terminal host 100 to automatically run the fingerprint identification driver and application program in the terminal host 100. In one embodiment, the technology to let the operation system of the terminal host 100 automatically run the fingerprint identification driver and application program is to simulate the public block 104A of the memory module 104 as a CD-ROM booting area. Then, the terminal host 100 displays a window or a message to guide the user to operate this storage. Next, the controller 101 controls the fingerprint sensor 106 to read the to-be-recognized fingerprint data of the user, and transmits the to-be-recognized fingerprint data to the terminal host 100. Then, the controller 101 decrypts the fingerprint template and transmits the template to the terminal host 100, which compares the decrypted fingerprint template with the to-be-recognized fingerprint data. After the decrypted fingerprint template substantially matches with the to-be-recognized fingerprint data, the controller 101 enables the terminal host 100 to recognize the large-capacity storage unit 103A. Also, the controller 101 gets and decrypts the key for the encryption/decryption chip from the hidden block 104B and transmits the decrypted key to the encryption/decryption chip, such that the terminal host 100 decrypts data read from the large-capacity storage unit or encrypts data to be written into the large-capacity storage unit 103A through the controller 101 and the encryption/decryption chip 102.

Figure 2:
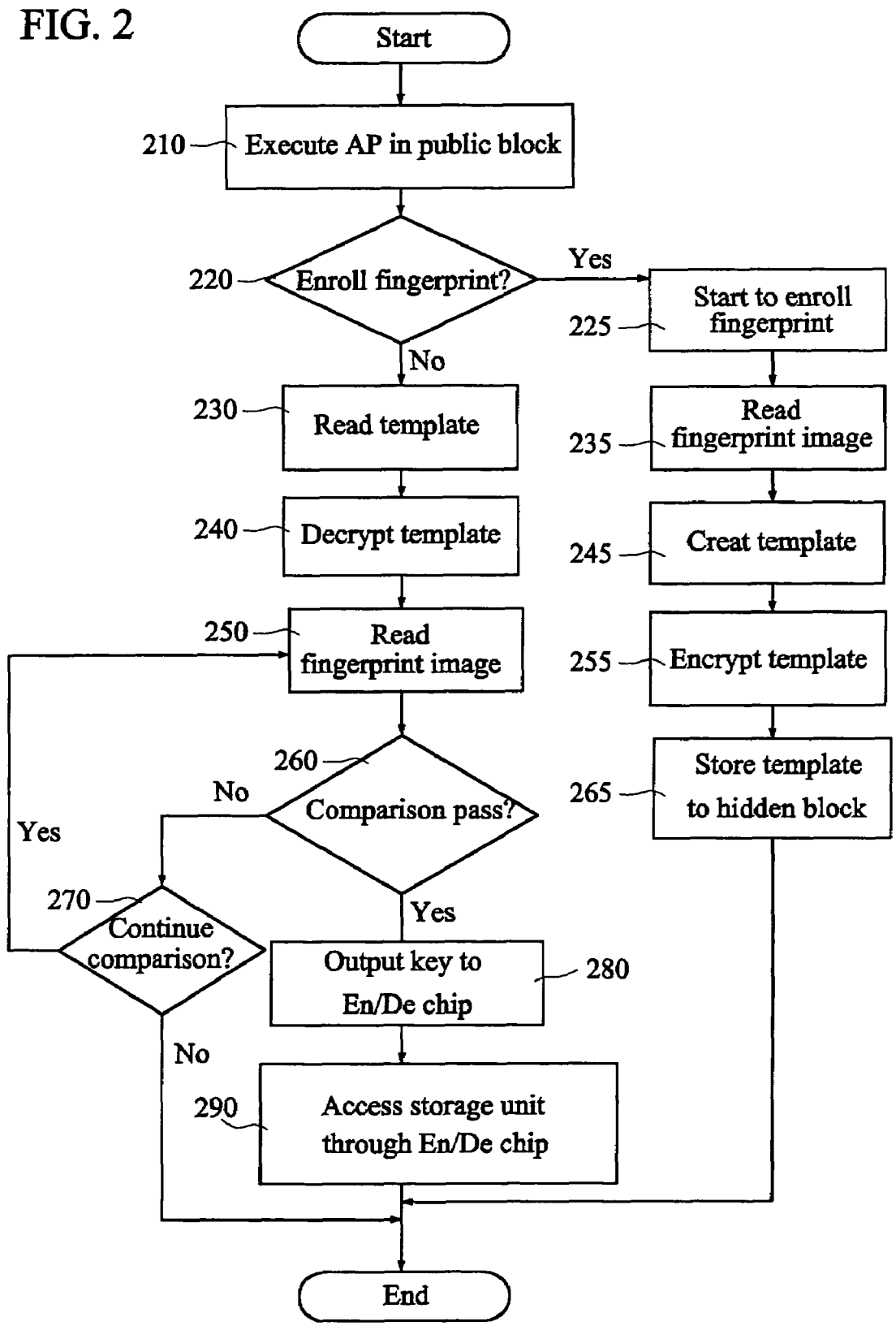
FIG. 2 is a flow chart showing a method for protecting data stored in the portable encrypted storage device 10 of the invention.

As shown in FIGS. 1 and 2, the method for protecting data stored in the portable encrypted storage device 10 of the invention after the device 10 is connected to the terminal host 100 is described in the following. First, the controller 101 communicates the terminal host 100 through the host interface 108, and enables the terminal host 100 to automatically run the fingerprint identification driver and application program in the terminal host 100, as shown in step 210. Then, in step 220, the terminal host 100 displays a window for the user to select or automatically judge whether a fingerprint enrolling mode (step 225) or a fingerprint authentication mode (step 230) is to be entered.

If the fingerprint enrolling mode is to be entered, the terminal host 100 informs the controller 101 to control fingerprint sensor 106 to read the fingerprint template of the authorized user, and transmits the fingerprint template to the terminal host 100 (steps 235 and 245). At this time, the terminal host 100 utilizes the fingerprint application program to process the fingerprint template, and transmits the processed fingerprint template to the hidden block 104B for storage. Alternatively, the fingerprint application program can encrypt the fingerprint template data according to the key (step 255), and then the encrypted fingerprint template is transmitted to the hidden block 104B (step 265).

If the fingerprint authentication mode is to be entered, the controller 101 reads the fingerprint template from the hidden block 104B (step 230), and the fingerprint template can be transmitted to the terminal host 100, which can decrypt the fingerprint template data according to the key (step 240). Next, the terminal host 100 informs the controller 101 to control the fingerprint sensor 106 to read the to-be-recognized fingerprint data of the user, and transmits the to-be-recognized fingerprint data and the key to the terminal host 100 (step 250). Then, the terminal host 100 utilizes the application program to process the to-be-recognized fingerprint data and the fingerprint template, and judges whether or not the to-be-recognized fingerprint data and the fingerprint template substantially match with each other. When the to-be-recognized fingerprint data substantially matches with the fingerprint template, the key is transmitted to the encryption/decryption chip 102 (step 280), and the terminal host 100 is enabled to recognize the originally hidden large-capacity storage unit 103A and to access the large-capacity storage unit 103A through the encryption/decryption chip (step 290). On the contrary, the large-capacity storage unit 103A is still kept hidden to prevent the terminal host 100 from accessing the storage unit 103A, or the program can ask the user to try again for authentication (step 270).

Figure 3:
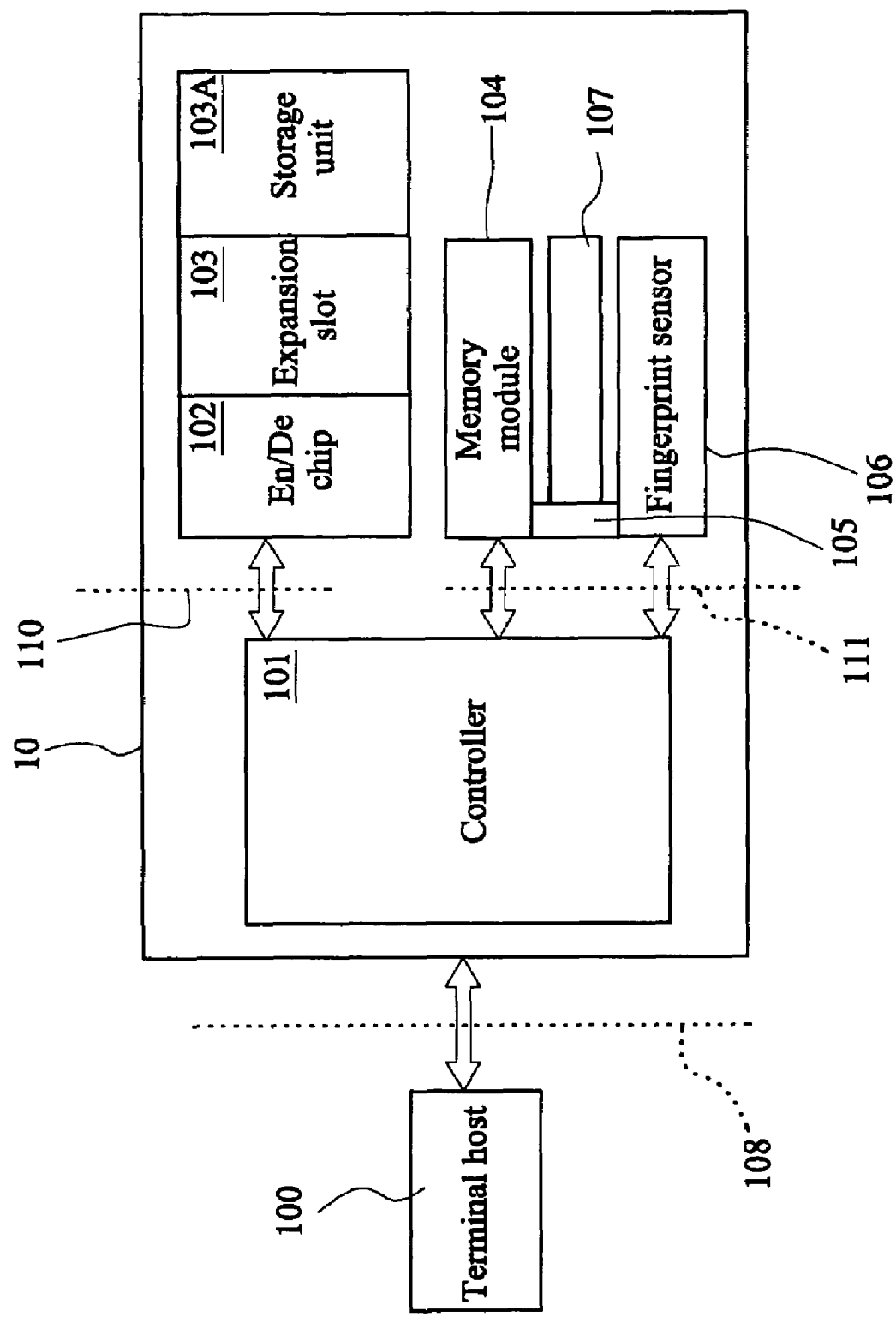
FIG. 3 is a block diagram showing a portable encrypted storage device 10 with biometric identification according to a second embodiment of the invention.

In another embodiment of the invention, as shown in FIG. 3, the portable encrypted storage device 10 includes the controller 101, the memory module 104, the large-capacity storage unit 103A, the fingerprint sensor 106 and the host interface 108, which are similar to those of FIG. 1, and additionally includes a memory expansion slot 105 electrically connected to the controller 101. In this case, the device can be regarded as a memory reader electrically connected to an external memory 107 through the memory expansion slot 105. The external memory may be, for example, the smart media, the memory stick or other external memory with standard interfaces. The expansion slot 105 to be electrically connected to the external memory 107 is electrically connected to the controller 101 through the memory interface 111. Then, the data in the external memory 107 may be encrypted and copied to the large-capacity storage unit 103A, and the external memory 107 can be accessed and protected by way of encryption. Consequently, the data in the external memory 107 can be deleted and other data can be stored in the external memory 107. Hence, when the decrypted fingerprint template substantially matches with the to-be-recognized fingerprint data, the external memory 107 and the large-capacity storage unit 103A are enabled to communicate with the encryption/decryption chip 102 through the key under the control of the user.

According to the device of the invention, the connected devices that can be viewed from the computer system do not include a non-volatile memory, a large-capacity storage unit and a fingerprint sensor. So, it is unnecessary to install the drivers for the non-volatile memory, the large-capacity storage unit and the fingerprint sensor, and the computer system does not have to control the operations of three or more than three devices in a multiplex manner. Instead, the computer system recognizes that only one portable large-capacity storage unit is connected thereto, and the computer system only has to control the operation of one device. The controller can control the operations of the non-volatile memory, the large-capacity storage unit, the memory expansion slot and the fingerprint sensor in the portable large-capacity storage unit. It is to be noted that the controller of the invention may broadly include other components for controlling the operations of the non-volatile memory, the large-capacity storage unit, the fingerprint sensor, the read only memory (ROM), and the random access memory (RAM).

Thus, the invention provides the portable encrypted storage device with the biometric identification to achieve four features. The first feature is to utilize the processor of the terminal host to perform the fingerprint processing and identification procedure, so the hardware cost of the device can be greatly reduced, and the product can be popularized. The second feature is to provide the function of completely and automatically running the fingerprint application program. The firmware for the USB controller, the fingerprint identification and processing software, and the associated application program (AP) are integrated together. So, it is possible to use the invention device without manually installing any driver or identification software in the terminal hosts, which operate in various operation systems and support various language interfaces. The third feature is that the protected portable large-capacity storage unit is kept hidden, and the terminal host cannot recognize the portable large-capacity storage unit until the identification of the user is verified. The fourth feature is that the real-time encryption/decryption chip is added in front of the protected portable large-capacity storage unit. After the identification of the user is verified, the controller writes the encryption/decryption key into the encryption/decryption chip to encrypt and write data into the portable large-capacity storage unit, or to read and decrypt data from the portable large-capacity storage unit.

In addition, the data stored in the portable large-capacity storage unit of the device has been encrypted by the encryption/decryption chip, so the correct format and content of the data of the portable large-capacity storage unit still cannot be captured even if the storage unit is stolen. Furthermore, the key for the encryption/decryption chip is not directly stored in the chip and cannot be obtained after the fingerprint comparison passes, so the safety level can be increased to a level higher than that of any prior art. It should be noted that the portable storage device may also have the function of independently identifying the biometric data of the user. In this case, the portable storage device has its own identification microprocessor to perform the biometric identification, and the application program in the portable may be carried anywhere and automatically run in various terminal hosts for guiding the user to operate the storage device.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications

What is claimed is:

1. A portable encrypted storage device to be connected to a terminal host, the portable encrypted storage device comprising:

a host interface connected to the terminal host;

a controller connected to the host interface;

a fingerprint sensor, connected to the controller, for sensing to-be-recognized fingerprint data of a user;

a memory module connected to the controller, wherein the memory module is divided into a public block for storing at least one fingerprint identification application program, and a hidden block for storing at least one fingerprint template and a key;
an encryption/decryption chip connected to the controller;
a storage interface expansion slot connected to the encryption/decryption chip; and
a large-capacity storage unit connected to the storage interface expansion slot, wherein:
the controller communicates with the terminal host through the host interface by handshakes, and enables the terminal host to automatically run the at least one fingerprint identification application program in the terminal host;
the controller controls the fingerprint sensor to read the to-be-recognized fingerprint data of the user, and transfers the to-be-recognized fingerprint data to the terminal host;
the controller decrypts and then transmits the at least one fingerprint template to the terminal host, which compares the at least one decrypted fingerprint template with the to-be-recognized fingerprint data, and enables the terminal host to recognize the large-capacity storage unit when the at least one decrypted fingerprint template matches with the to-be-recognized fingerprint data; and
the controller gets and decrypts the key for the encryption/decryption chip from the hidden block and transmits the decrypted key to the encryption/decryption chip, such that the controller accesses the large capacity storage unit through the encryption/decryption chip, which encrypts data to be written into the large capacity storage unit, or decrypts the data read from the large-capacity storage unit.

2. The device according to claim 1, wherein the at least one fingerprint template is the data encrypted according to the key.

3. The device according to claim 1, wherein the host interface is a universal serial bus (USB) interface, a PCMCIA interface, a PCI express interface or an IEEE 1394 interface, and the storage interface is an IDE interface, a SCSI interface, a serial ATA interface, a compact flash (CF) interface, a PCMCIA interface or an IEEE 1284 interface.

4. The device according to claim 1, wherein the fingerprint sensor is an area-type fingerprint sensor or a sweep-type fingerprint sensor.

5. The device according to claim 1, further comprising:
an expansion slot electrically connected to the controller, wherein the expansion slot is electrically connected to an external memory, such that the external memory communicates data with the large-capacity storage unit through the encryption/decryption chip under a control of the user when the at least one decrypted fingerprint template and the to-be-recognized fingerprint data match with each other.

6. The device according to claim 1, wherein the key is generated by software with varying time.

7. The device according to claim 1, wherein the large-capacity storage unit is a magnetic hard drive or an optical drive.

8. The device according to claim 1, wherein the encryption/decryption chip operates according to a symmetrical algorithm with a data encryption standard (DES) or a triple DES.

9. A method for protecting data stored in a portable encrypted storage device, the method comprising, after the portable encrypted storage device is connected to a terminal host, the steps of:
communicating with the terminal host by handshakes and automatically running a fingerprint identification application program in the terminal host;
reading to-be-recognized fingerprint data of a user, and transferring the to-be-recognized fingerprint data to the terminal host; and
decrypting a fingerprint template and then transmitting the decrypted fingerprint template to the terminal host, which compares the decrypted fingerprint template with the to-be-recognized recognized fingerprint data, wherein when the decrypted fingerprint template matches with the to-be-recognized fingerprint data, the terminal host recognizes a large-capacity storage unit of the storage device, and a controller of the storage device gets and decrypts a key for an encryption/decryption chip of the storage device from a hidden block and transmits the decrypted key to the encryption/decryption chip, such that the controller accesses the large-capacity storage unit through the encryption/decryption chip, which encrypts data to be written into the large-capacity storage unit, or decrypts the data read from the large-capacity storage unit.

10. The method according to claim 9, wherein the fingerprint template is the data encrypted according to the key.

11. The method according to claim 9, wherein the key is generated by software with varying time.

12. The method according to claim 9, wherein the encryption/decryption chip operates according to a symmetrical algorithm with a data encryption standard (DES) or a triple DES.

* * * * *